United States Patent [19]

Takago et al.

[11] Patent Number: 5,364,676
[45] Date of Patent: Nov. 15, 1994

[54] GASKET-SEALED CASING FOR FIXED DISC MEMORY UNIT

[75] Inventors: Toshio Takago; Kazuhiko Tomaru; Noboru Shimamoto; Hiroshi Inomata; Shinichi Sato, all of Gunma, Japan

[73] Assignee: Shin-Etsu Chemical Co., Ltd., Tokyo, Japan

[21] Appl. No.: 86,760

[22] Filed: Jul. 6, 1993

Related U.S. Application Data

[62] Division of Ser. No. 918,089, Jul. 24, 1992, abandoned.

[30] Foreign Application Priority Data

Jul. 25, 1991 [JP] Japan ................... 3-208520

[51] Int. Cl.$^5$ ................................. B32B 3/14
[52] U.S. Cl. ......................... 428/35.7; 428/76; 428/447; 428/448; 206/444; 206/521; 206/524.1; 227/275
[58] Field of Search ............ 264/259, 271.1; 428/35.7, 76, 81, 192, 447, 448; 277/225; 206/444, 521, 524.1

[56] References Cited

U.S. PATENT DOCUMENTS

| | | | |
|---|---|---|---|
| 4,247,510 | 1/1981 | Desverchere | 264/259 |
| 4,719,065 | 1/1988 | Gibbon | 264/259 |
| 4,950,521 | 8/1990 | Takamura et al. | 277/227 |
| 5,057,265 | 10/1991 | Kunert et al. | 264/259 |
| 5,108,526 | 4/1992 | Cornils et al. | 264/177.1 |
| 5,147,691 | 9/1992 | Shimamoto et al. | 427/387 |

Primary Examiner—Charles R. Nold
Attorney, Agent, or Firm—Millen, White, Zelano & Branigan

[57] ABSTRACT

A casing of a fixed disc memory unit consisting of a case body and a covering member jointly forming the casing with an air-tight sealing of a rubbery gasket therebetween can be imparted with very reliable moisture-proofness of sealing by forming the rubbery gasket by the FIPG method using a curable rubber composition comprising: (a) a fluorocarbon-containing organosiloxane polymer containing vinyl groups and consisting of the recurring units each represented by the general formula

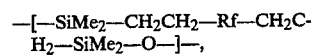

in which Rf is a fluorinated divalent polyether group; (b) an organohydrogenpolysiloxane or a fluorocarbon-containing organohydrogensiloxane having, in a molecule, at least two hydrogen atoms directly bonded to the silicon atoms; and (c) a catalytic compound in an amount sufficient to effect the addition reaction between the components (a) and (b).

6 Claims, No Drawings

GASKET-SEALED CASING FOR FIXED DISC MEMORY UNIT

This application is a division of application Ser. No. 07/918,089, filed Jul. 24, 1992, abandoned.

BACKGROUND OF THE INVENTION

The present invention relates to an improvement in a gasket-sealed casing for a fixed disc memory unit or, more particularly, to an improvement in a casing for a fixed disc memory unit consisting of a case body and a covering member jointly forming the casing with an air-tight sealing of a gasket along the peripheral flange between the case body and the covering member, whereby the casing is imparted with greatly improved reliableness and stability of the air-tight sealing.

As is well known, many of conventional computers and other data processing electronic instruments utilize a floppy disc as an external data storage medium. It is a trend in recent years that the floppy discs are increasingly being replaced with fixed disc memory units by virtue of the much larger capacity of memory storage thereof than floppy discs and the much shorter access time for reading-out of the stored information. The above mentioned fixed disc memory unit is a thin rigid disc usually made of an aluminum alloy and coated with a layer of a material for magnetic recording, which is encased in a casing consisting of a case body and a covering member jointly forming the casing with a rubbery gasket therebetween to ensure air-tightness. The disc member is rotated at a high speed by means of a spindle motor while a magnetic head to face the rotating disc keeping a very narrow clearance therebetween of only about 0.5 $\mu$mm serves to write-in and read-out the magnetically recorded information into and out of the disc.

As is readily understood from the above described working principle of a fixed disc memory unit, very serious troubles are caused by dusts entering the clearance between the rotating disc and the magnetic head. Accordingly, it is usual that such a fixed disc is encased together with a spindle motor in an air-tightly sealed casing consisting jointly of a case body and a covering member with a rubbery gasket member along the peripheral flange at which the two parts are jointed together. The air inside of the casing should be kept always as clean or dust-free as possible by means of high-performance filters for internal air circulation and for ventilation with the outer atmosphere. In this regard, the gasket member is required to be extremely reliable and stable to ensure air-tightness over the life of the memory unit. Needless to say, it is essential that no dust is produced from the gasket member per se.

Various rubbery materials, both in a spongy form or in a solid, i.e. non-spongy, form, have been proposed as a material of the gasket member including silicone-based, i.e. organopolysiloxane-based, rubbers, urethane rubbers, polychloroprene rubbers, NBR rubbers and the like as well as certain thermoplastic resins having rubbery elasticity such as polyethylenes. These rubbery materials are molded and cured into a sheet having a specified thickness which is punched by using a punching die into the form of a desired gasket member or, alternatively, molded and cured in the form of the desired gasket member using a metal mold.

It is a conventional procedure that, in order to facilitate mounting of the above mentioned preshaped gasket member on the peripheral flange of the case body or the covering member, the preshaped gasket member is coated with a sticky adhesive with a release paper wrapping the adhesive-coated surface for temporary protection, which is removed prior to mounting of the gasket member on the peripheral flange. Alternatively, the peripheral flange is coated beforehand with a sticky adhesive before the gasket member is mounted thereon. These methods using a sticky adhesive are not always quite satisfactory as an industrial process because of the low working efficiency therefor in addition to possible drawbacks that the adhesive-coated surface is highly susceptible to dust deposition and a difficulty is encountered in the exact positioning to mount the gasket member on the correct position consequently leading to an increase in the manufacturing cost of the disc unit.

It should be noted, moreover, that preparation of die-punched gasket members is economically disadvantageous in respect of the costs for the punching dies and occurrence of a large amount of punching debris which must be disposed with some additional costs in order not to cause a problem of environmental pollution. Preparation of molded gasket members is also economically disadvantageous in respect of the costs for the metal molds in addition to a possible problem that the surface finishing of molded gaskets is sometimes incomplete eventually leading to formation of dust particles thereby.

One of the inventors and his co-inventor have recently proposed, in U.S. Pat. No. 4,950,521, in situ formation of a rubbery gasket member on the peripheral flange of the covering member of such a casing by the so-called formed-in-place gasket (FIPG) method in which a flowable and room temperature-curable or heat-curable silicone rubber composition is put as extruded from a dispenser nozzle in the form of a gasket along the peripheral flange followed by curing in situ to form a cured gasket member. This method is indeed effective to solve almost all of the problems m the above described prior art gasket members but has another problem that silicone rubber gasket thus formed has a relatively high coefficient of moisture permeation of as large as 50 to 100 g·mm/m$^2$·24 hours in an atmosphere of 90±2% relative humidity at 40±0.5° C. so that the fixed disc memory unit assembled therewith can be used only under limited ambient conditions in order to avoid possible troubles caused by moisture.

SUMMARY OF THE INVENTION

The present invention accordingly has an object to provide an improvement in the gasket-sealed casing for a fixed disc memory unit free from the above described problems and disadvantages in the prior art gasket-sealed casings.

Thus, the present invention provides an improvement, in a method for the preparation of a casing for a fixed disc memory unit consisting of a case body and a covering member jointly forming the casing with an air-tight sealing of a rubbery gasket along the peripheral flange between the case body and the covering member, which comprises:

(A) forming, along the peripheral flange of the case body or the covering member, a form of an extrudable and heat-curable fluorocarbon-containing organosiloxane-based rubber composition shaped in the form of a gasket; and (B) heating the form of the extrudable and heat-curable fluorocarbon-containing organosiloxane-based composition shaped in the form of a gasket so as to effect curing of the composition into a rubber, the extrudable and heat-curable fluorocarbon-containing organo-siloxane-based rubber composition comprising, as a uniform blend:

(a) a fluorocarbon-containing organosiloxane polymer containing aliphatically unsaturated groups or, preferably, vinyl groups and consisting of the recurring units each represented by the general formula $$-[-SiMe_2-CH_2CH_2-Rf-CH_2CH_2-SiMe_2-O-]-, \quad (I)$$

in which Me is a methyl group and Rf is a fluorinated divalent polyether group expressed by the formula $$(-CF_2CF_2OCF_2-)_a-[-CF(CF_3)OCF_2-]_b-(-CF_2-)_c- \quad (II)$$

the subscripts a and e each being 0 or 1, b and d each being a positive integer of 1 to 4 and c being 0 or a positive integer not exceeding 8;

(b) an organohydrogenpolysiloxane or a fluorocarbon-containing organohydrogensiloxane having, in a molecule, at least two hydrogen atoms directly bonded to the silicon atoms in an amount sufficient to provide from 1.0 to 4.0 moles of the silicon-bonded hydrogen atoms per mole of the aliphatically unsaturated groups or vinyl groups in the component (a);

(c) a catalytic compound in an amount sufficient to effect the addition reaction between the components (a) and (b); and, preferably, (d) an adhesion aid in an amount sufficient to promote adhesion of the composition by curing to the surface of the peripheral flange.

DETAILED DESCRIPTION OF THE PREFERRED EMBODIMENTS

As is described above, the improvement according to the present invention can be achieved by using a very specific extrudable and heat-curable fluorocarbon-containing organosiloxanebased rubber composition defined above. The gasket member in the casing is formed in situ by the FIPG method by using this rubber composition which is cured in situ into a rubbery form.

Namely, the extrudable and heat-curable fluorocarbon-containing organosiloxane-based rubber composition is a uniform blend comprising the above defined components (a) to (c), of which the principal ingredient is the component (a) consisting of the divalent recurring units expressed by the formula (I). It is essential that this polymer has at least two aliphatically unsaturated groups or, preferably, vinyl groups bonded to the silicon atoms. The position at which the vinyl group is bonded to the silicon atom is not particularly limitative but it is usual that the vinyl groups are bonded to the silicon atoms at the molecular chain terminals. For example, forming a terminal end-blocking group which may be a dimethyl vinyl silyl group of the formula $-SiMe_2-CH=CH_2$.

The component (b), which serves as a crosslinking agent for the component (a) is an organohydrogenpolysiloxane or a fluorocarbon-containing organohydrogensiloxane having, in a molecule, at least two or, preferably, at least three hydrogen atoms directly bonded to the silicon atoms. The organohydrogenpolysiloxane is a well known material in the art of silicones. The molecular structure of the fluorocarbon-containing organohydrogensiloxane can be the same as or similar to the component (a) excepting presence of the silicon-bonded hydrogen atoms. For example, the fluorocarbon-containing organohydrogensiloxane having silicon-bonded hydrogen atoms is exemplified by the compounds expressed by the formulas:

$$[H-SiMe_2-O-]_3Si-CH_2CH_2-Rf-CH_2CH_2-Si[-O-SiMe_2-H]_3;$$

$$[H-SiMe_2-O-]_3Si-CH_2CH_2-Rf-CH_2CH_2-Si[-O-SiMe_2-H]_2[-O-SiMe_2-CH_2CH_2-O-G];$$

and $$[H-SiMe_2-O-]_3Si-CH_2CH_2-Rf-CH_2CH_2-Si[-O-SiMe_2-H]_2[-O-SiMe_2-CH_2CH_2Si(OMe)_3],$$

in which Me and Rf each have the same meaning as defined above and G is a glycidyl group. Some of these compounds may serve also as an adhesion aid so that no separate component (d) is required.

The amount of the component (b) in the rubber composition should be sufficient to provide from 1.0 to 4.0 moles of the silicon-bonded hydrogen atoms per mole of the aliphatically unsaturated groups or vinyl groups in the component (a). When the amount of the component (b) is too small, no full curing of the composition can be obtained while an excessive amount of the component (b) is undesirable due to certain adverse influences on the mechanical properties of the cured rubber.

The component (c), which is a catalyst to promote the addition reaction or so-called hydrosilation reaction between the vinyl groups in the component (a) and the silicon-bonded hydrogen atoms in the component (b). Suitable catalytic compounds, well known in the art of silicones, include various kinds of compounds of the platinum-group metals exemplified by chloroplatinic acid, alcohol-modified chloroplatinic acid, complexes of chloroplatinic acid with an olefin, chloro-tris(triphenylphosphine) rhodium, i.e. the Wilkinson catalyst, acetylacetonato rhodium (III) and the like. These catalytic compounds are used preferably as dissolved in an organic solvent such as alcohols, ketones, ethers, hydrocarbons and the like.

The amount of the component (c) in the rubber composition should be adequately selected in consideration of the balance between the desired curing velocity of the rubber composition and the cost for the catalytic compound since the catalytic compounds of a platinum group metal are generally very expensive. It is usual that the amount thereof is in the range from 1 to 100 ppm by weight based on the total amount of the components (a) and (b) as calculated as the platinum group metal.

The fluorocarbon-containing curable rubber composition used in the invention can be prepared by uniformly blending the above described components (a) to (d) each in a specified amount. It is optional that the rubber composition is further admixed with various kinds of known additives including reinforcing and non-reinforcing fillers, coloring agents and the like each in a limited amount. Suitable fillers include fine powders of silica, carbon, mica, calcium carbonate, alumina, iron oxide, talc, boron nitride, silicon carbide, silicon nitride and the like.

It is desirable that the curable rubber composition has such a rheological property that, when the composition is applied to the surface of a substrate in the form having a cross section of a gasket, the form of the gasket is fully retained even before curing but the composition is extrudable out of a nozzle of a dispenser. For example, the composition should have a consistency or viscosity in the range from 10 to 100,000 poise at room temperature. These requirements can be satisfied by adequately selecting the compounding proportion of the essential and optional components to form the composition. It is further desirable that the rubber composition is prepared in such a formulation that the rubber composition after curing may have a rubber hardness of 10 to 60 Hs in the scale A according to JIS K 6301 in order to avoid localization of the stress caused by fastening the case body and the covering member with the in situ cured rubber gasket therebetween.

Provided that the rubber composition is adequately formulated, the composition can be transported by pumping and is extrudable out of a nozzle of a dispenser so that a form of a desired gasket can be easily formed on the peripheral flange of the case body or, preferably, on the covering member. The cross section of the thus obtained gasket form usually has a semicircular cross sectional profile but, if desired, the cross section has a fiat upper line by appropriately adjusting the conditions of extrusion such as the height of the extrusion nozzle above the substrate surface.

The above mentioned work for forming the gasket form from the curable rubber composition can be very efficiently performed by using a robotized coating machine which drives the extrusion nozzle of the dispenser along the desired pattern according to the memory to ensure exactness of the coating position.

The gasket form formed on the peripheral flange of the case body or the covering member from the curable rubber composition can be cured by heating at a temperature of 120° to 200° C. for a length of time from 5 to 240 minutes. After complete curing of the gasket form into a rubber, the case body and the covering member, either of which has been provided with the in situ cured gasket member on the peripheral flange, are jointed together by fastening with screws or other suitable means to give a completed casing for a fixed disc memory. It is desirable that, prior to assemblage, the in situ cured gasket member is subjected to a cleaning treatment by washing with rinse water or air blow to remove any dust particles. The cured gasket member according to the invention has a very small coefficient of moisture permeation so that the casing prepared according to the inventive improvement can be used any atmosphere of a high humidity without causing troubles due to moisture penetration.

In the following, the improvement of the present invention is described in more detail by way of examples.

EXAMPLE 1

A curable rubber composition was prepared by uniformly blending:
100 parts by weight of a fluorocarbon-containing organosiloxane compound expressed by the formula CH$_2$=CH—SiMe$_2$—O—[-
—SiMe$_2$—CH$_2$CH$_2$(CF$_2$)$_6$CH-
$_2$CH$_2$—SiMe$_2$—O—]$_m$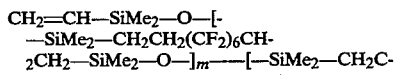[—SiMe$_2$—CH$_2$C-

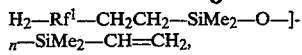

in which the subscripts m and n are each a positive integer with the proviso that the ratio of m:n=1:10 and Rf$^1$ is a fluorocarboncontaining divalent polyether group of the formula

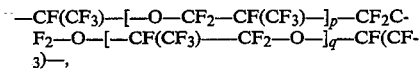

the subscripts p and q each being a positive integer with the proviso that p+q=3;
3.0 parts by weight of a fluorocarbon-containing organosiloxane compound having silicon-bonded hydrogen atoms and expressed by the formula

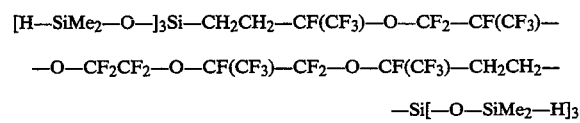

as a crosslinking agent;
1.03 parts by weight of a 2% by weight toluene solution of acetylacetonato rhodium of the formula Rh(CH$_3$COCHCOCH$_3$)$_3$ as a curing catalyst;
1.56 parts by weight of a compound expressed by the formula

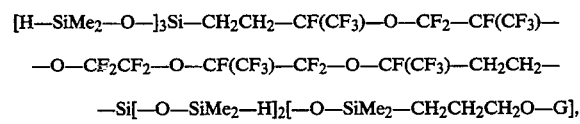

in which G is a glycidyl group, which served both as a crosslinking agnet and as an adhesion aid; and
2 parts by weight of a carbon black (Ketjen EC600JD, a product by Ketjen Black International Co.) as a coloring agent. This rubber composition had a viscosity of 18,000 poise at 25° C. and could rtain the form as it was extruded out of a nozzle.

The above prepared rubber composition could be cured by heating at 150° C. for 60 minutes into a cured rubber, of which mechanical properties were measured according to the testing procedures specified in JIS K 6301 to give the results of: hardness of 45 in the JIA scale; ultimate elongation at break of 260%; tensile strength of 47 kgf/cm$^2$; and tear strength of 7 kgf/cm. The moisture-permeation coefficient of the cured rubber was 20 g.mm/m$^2$.24 hours under the testing conditions specified in JIS K 6301.

The above prepared curable rubber composition was applied by operating a robotized FIPG coating machine to the peripheral flange of a covering member of a casing for fixed disc memory unit made from an aluminum alloy and coated with an epoxy resin-based coating composition so as to form a gasket form having a semicircular cross section with a height of 1.50 mm and a basal width of 2.00 mm after curing by heating at 150° C. for 60 minutes in a hot air circulation oven followed by cooling. The conditions for coating were that: the dispenser nozzle had an inner diameter of 1.69 mm; rotation of the dispenser rotor was 30 rpm; coating speed was 200 meters/minute, nozzle height was 2.20 mm above the substrate surface; and rate of extrusion was 0.066 ml/second. The adhesion between the thus in situ cured rubber gasket and the substrate surface was found to be very firm.

The covering member provided with the rubber gasket thereon was repeatedly washed with pure water having an electroconductivity of 10 μS or higher after filtration through a membrane filter having a pore diameter of 0.5 μm and then spontaneously dried in a clean room keeping a cleanness of 100 (0.3 μm). The covering member after the cleaning treatment was put on a case body of the casing in the same clean room and airtightly fastened thereto by using screws to give an integrated casing for a fixed disc memory unit. The thus assembled casing was subjected to the airleak test by pressurizing up to a pressure of +100 mmH2O and measuring the pressure after keeping for i minute to detect no noticeable pressure drop.

EXAMPLE 2

Another fluorocarbon-containing curable rubber composition was prepared by uniformly blending:
100 parts by weight of a fluorocarbon-containing organosiloxane polymer expressed by the formula $$CH_2=CH-SiMe_2-O-[-SiMe_2-CH_2CH_2-CF(CF_3)-$$
$$-O-CF_2-CF(CF_3)-O-CF_2CF_2-O-CF(CF_3)-CF_2-O-$$
$$-CF(CF_3)-CH_2CH_2-SiMe_2-O-]_{20}-SiMe_2-CH=CH_2;$$

4.65 parts by weight of a compound expressed by the formula $$[H-SiMe_2-O-]_3Si-CH_2CH_2-CF(CF_3)-O-CF_2-CF(CF_3)-$$
$$-O-CF_2CF_2-O-CF(CF_3)-CF_2-O-CF(CF_3)-CH_2CH_2-$$
$$-Si[-O-SiMe_2-H]_2[-O-SiMe_2-CH_2CH_2CH_2O-G],$$

in which G is a glycidyl group, as a crosslinking agent;
1.0 part by weight of a 1% by weight toluene solution of tris(triphenylphosphine) rhodium (I) chloride as a curing catalyst;
5 parts by weight of a fumed silica filler surface-blocked with trimethylsiloxy groups as a reinforcing filler; and
0.5 part by weight of a carbon black (Denka Black, a product by Denki Kagaku Kogyo Co.) as a coloring agent.

The above prepared rubber composition could be cured by heating at 150° C. for 60 minutes into a cured rubber, of which mechanical properties were measured according to the testing procedures specified in JIS K 6301 to give the results off hardness of 30 in the JIS A scale; ultimate elongation at break of 400%; tensile strength of 30 kgf/cm²; and tear strength of 5 kgf/cm. The moisture-permeation coefficient of the cured rubber was 19 g.mm/m².24 hours under the testing conditions specified in JIS K 6301.

A gasket-sealed casing for a fixed disc memory unit was constructed by using the above prepared curable rubber composition in substantially the same manner as in Example 1 to give testing results as satisfactory as in Example 1.

What is claimed is:

1. A casing for a fixed disc memory unit comprising a case body and a covering member jointly forming the casing with an air-tight seal of a rubbery gasket along a peripheral flange between the case body and the covering member, wherein the rubbery gasket is an in situ heat cured fluorocarbon-containing organosiloxane-based rubber composition from a uniform blend comprising:

(a) a fluorocarbon-containing at least two organosiloxane polymer containing aliphatically unsaturated groups and recurring units each represented by the formula $$-[-SiMe_2-CH_2CH_2-Rf-CH_2CH_2-SiMe_2-O-]-$$

in which Me is a methyl group and Rf is a fluorinated divalent polyether group expressed by the formula $$-(-CF_2CF_2OCF_2-)_a-[-CF(CF_3)OCF_2-]_b-$$
    $$-(-CF_2-)_c-[-CF_2OCF(CF_3)-]_d-(-CF_2OCF_2CF_2-)_e-$$

the subscripts a and e each being 0 or 1, b and d each being a positive integer of 1 to 4 and c being 0 or a positive integer not more than 8;

(b) an organohydrogenpolysiloxane or a fluorocarbon-containing organohydrogensiloxane having, in a molecule, at least two hydrogen atoms directly bonded to the silicon atoms in an amount sufficient to provide from 1.0 to 4.0 moles of the silicon-bonded hydrogen atoms per mole of the aliphatically unsaturated groups in the component (a); and (c) a catalytic compound in an amount sufficient to effect an addition reaction between the components (a) and (b).

2. The casing of claim 1, wherein the uniform blend for forming the rubber composition further comprises (d) an adhesion promoting amount of an adhesion aid.

3. The casing of claim 1, wherein component (a) of the uniform blend for forming the rubber composition contains at least two vinyl groups.

4. The casing of claim 1, wherein the catalyst component (c) is a platinum-group metal catalyst.

5. The casing of claim 1, wherein the catalyst component (c) is present in an amount in the range of from 1 to 100 ppm by weight of the total amount of the components (a) and (b).

6. The casing of claim 1, wherein the rubbery gasket is formed by the FIPG method.

* * * * *